Figure 4:
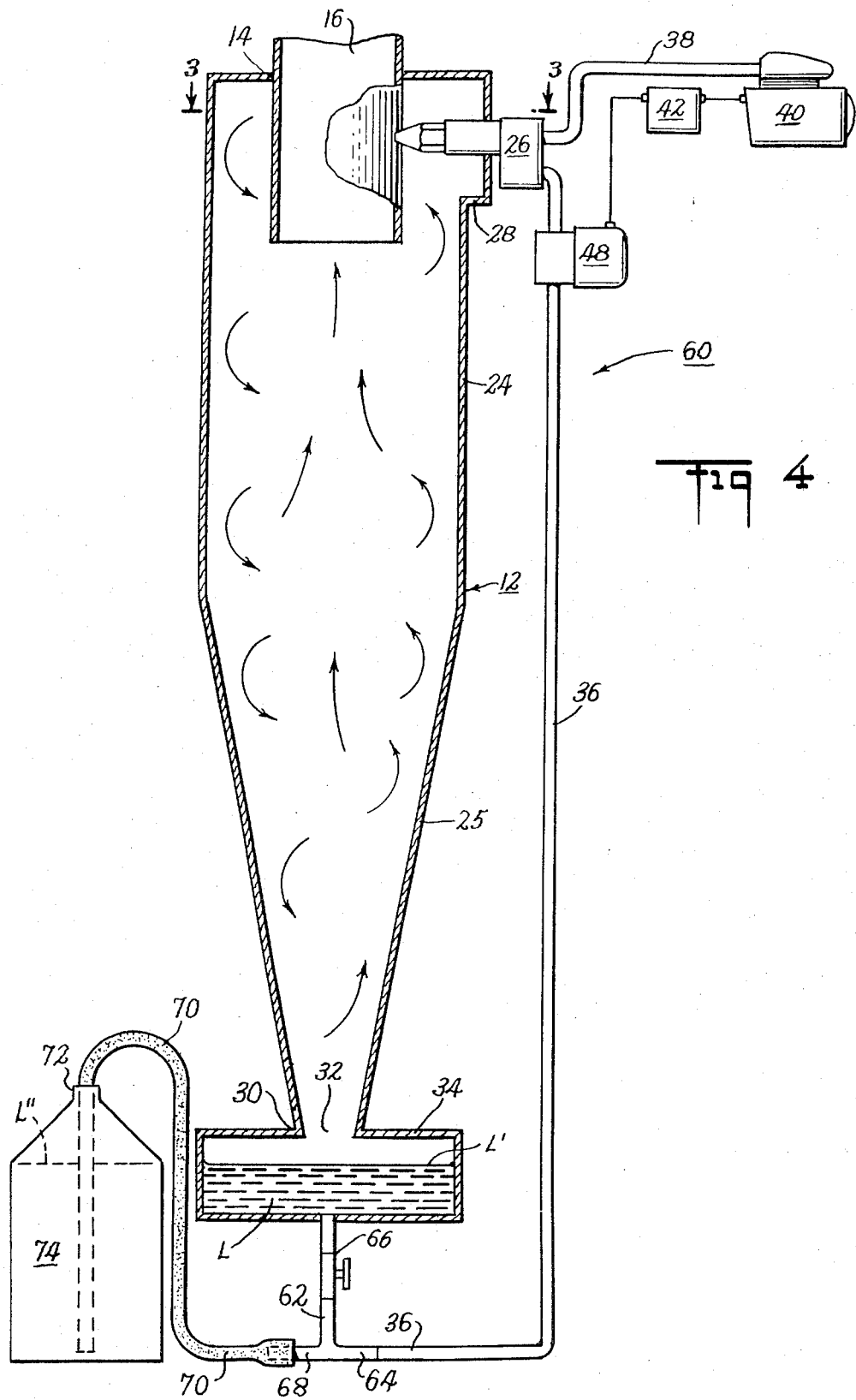

United States Patent [19]
Clark et al.

[11] 3,860,401
[45] Jan. 14, 1975

[54] METHOD AND DEVICE FOR PRODUCING DRY VAPOR

[75] Inventors: Charles W. Clark, Dumont; John M. Paulovich, Ridgefield Park; William Perlberg, Wyckoff, all of N.J.

[73] Assignee: Airwick Industries, Inc., Carlstadt, N.J.

[22] Filed: June 25, 1973

[21] Appl. No.: 373,290

Related U.S. Application Data

[63] Continuation-in-part of Ser. No. 338,447, March 6, 1973, abandoned.

[52] U.S. Cl............................ 55/89, 55/92, 55/238, 261/79 A
[51] Int. Cl............................................ B01d 47/06
[58] Field of Search.................. 55/92, 89, 235–238, 55/459; 261/79 A

[56] References Cited
UNITED STATES PATENTS

| | | | |
|---|---|---|---|
| 1,130,849 | 3/1915 | Seymore, Jr. | 55/238 |
| 2,725,951 | 12/1955 | Geary | 261/78 A |
| 3,304,011 | 2/1967 | Paasche | 261/116 |
| 3,324,632 | 6/1967 | Berneike et al. | 55/236 |
| 3,570,472 | 3/1971 | Santangelo | 261/116 |
| 3,710,554 | 1/1973 | Brookman | 55/236 |
| 3,724,180 | 4/1973 | Morton et al. | 55/456 |

*Primary Examiner*—Bernard Nozick
*Attorney, Agent, or Firm*—Curtis, Morris & Safford

[57] ABSTRACT

A device for producing dry vapor from a liquid air-treating agent, for use in air-conditioning systems or the like, includes a generally vertically extending vortex separator into which liquid air-treating agent is tangentially introduced as a spray mist having particles in a size range from less than one micron to at least several microns. The vortex separator has a centrally-located upper vapor-discharge opening and a lower liquid-discharge opening formed therein. By this arrangement the tangentially introduced spray mist moves spirally through the vortex separator with the larger particle sizes gravitating towards the periphery of the separator and settling out at the bottom thereof as a liquid, while vapor particles having a size of one micron or less remain adjacent the center of the separator and are discharged therefrom through the upper vapor opening for use in an air supply line.

21 Claims, 4 Drawing Figures

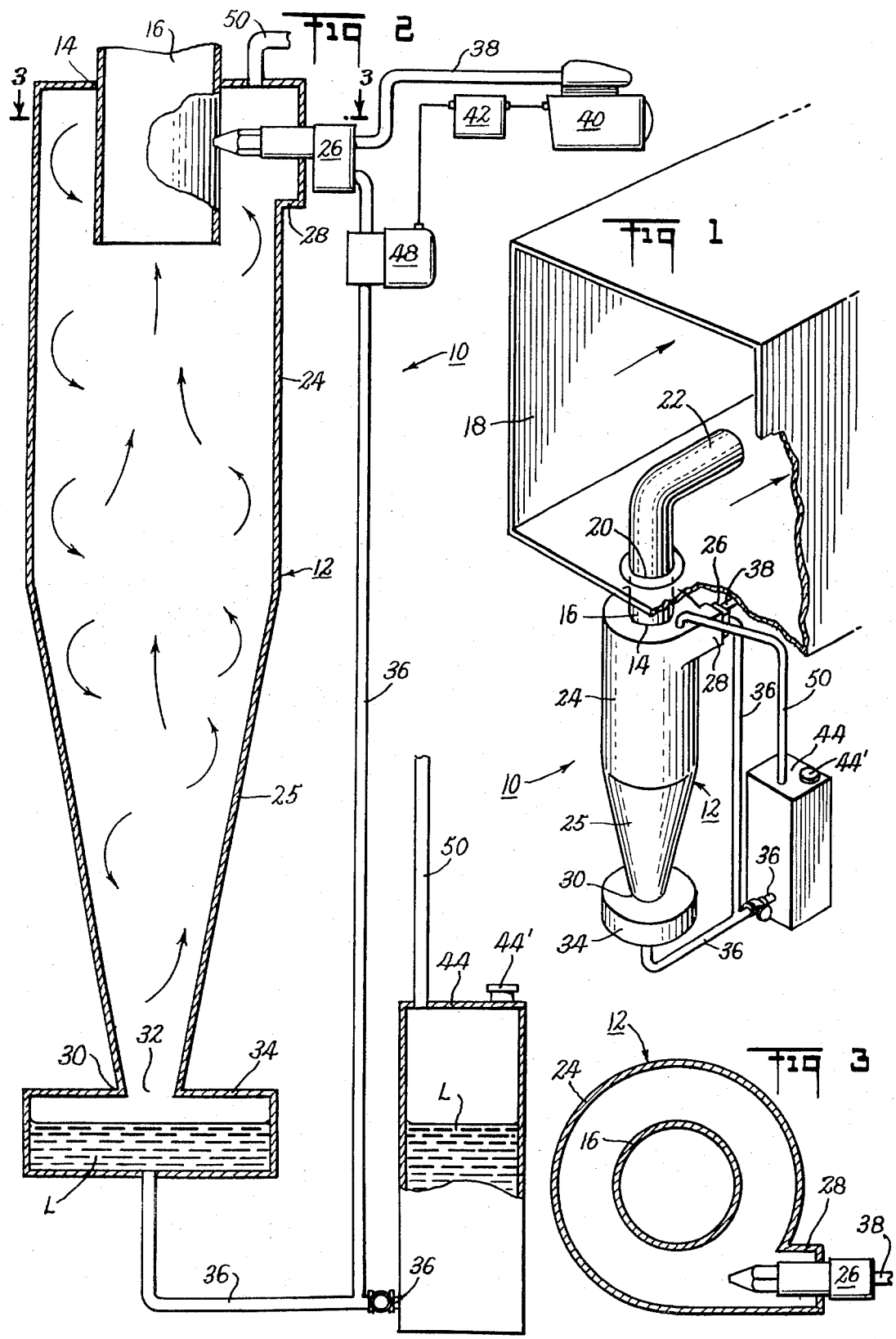

METHOD AND DEVICE FOR PRODUCING DRY VAPOR

The present application is a continuation-in-part of copending application Ser. No. 338,447, filed Mar. 6, 1973 now abandoned, the disclosure of which is incorporated herein by reference.

The present invention relates to air-treating devices, and relates in particular to an air-treating device which is adapted to supply an air-treating agent to an air supply line, such as of an air-conditioning system.

In various types of buildings it is often desirable, and even necessary, to supply an air-treating agent to the air in the building for sanitary or deodorizing purposes. This is particularly true, for example, in hospitals and nursing homes where sanitary conditions must be maintained and where odors must be controlled for the benefit of the patients, residents and vistors.

Previously proposed methods and devices for accomplishing this result include the use of separate, portable, aerosol spray cans of air-treating agents which are sprayed in individual rooms, and central air-treating systems for use in conjunction with the central air-conditioning system of a building. Such central air-treating systems generally spray liquid air-treating agent into the flow path of air supplied to the building through the air-conditioning system.

While such systems have been generally satisfactory in use, several problems have arisen in connection with their use. Thus, conventional spray systems introduce liquid droplets into the air flow ducts of the air-conditioning system, and thus into the air stream itself, under such conditions that it is possible for the droplets to condense in the system as a liquid which may soil or damage the air-conditioning ducts, outlets, or equipment. In any event, such condensed material is not dispensed in the atmosphere as desired. For instance, conventional atomizing equipment produces liquid particles of such a size distribution that many particles settle in the air distribution system under the influence of gravity without reaching their destination. Although ultrasonic devices can be used to obtain a dry (non-settling) vapor comprising very fine particles, the sonic energy input tends to heat the vapor to above-normal temperatures. When introduced into colder air, as in an air-conditioning system, such a vapor tends to condense thermally, also causing the problems discussed above.

Accordingly, it is an object of the present invention to provide an air-treating device for use with the central air-conditioning systems of buildings or the like in which a dry vapor of a liquid air-treating agent is introduced into the system.

Yet another object of the present invention is to introduce dry, non-settling vapor of a liquid air-treating agent into a central air-conditioning system.

A still further object of the present invention is to provide a method for making dry vapor from a liquid air-treating agent for use in central air-conditioning systems.

A still further object of the present invention is to provide a method and apparatus of the character described which is relatively simple and inexpensive in manufacture and use.

In accordance with one aspect of the present invention, a dry vapor is produced from a liquid air-treating agent, which vapor is adapted to be supplied to the air ducts of a central air-conditioning system or the like. To accomplish this, the apparatus of the invention includes a vertically extending vortex separator which has upper and lower portions respectively including a centrally-located upper vapor-discharge opening and a lower liquid-discharge opening therein. A liquid spray aspirator nozzle is mounted on or adjacent the vortex separator at the upper end thereof and is positioned to project a spray mist of liquid air-treating agent tangentially into the separator so that the spray mist travels through the separator along a generally spiral path, whereby the heavier particles in the spray mist gravitate towards the periphery of the separator while the smaller lighter particles remain in the center of the spiral vortex thus formed. Because the pressure in the separator is slightly above atmospheric, these lighter particles at the center of the separator are discharged through the upper vapor opening for use in a central air-conditioning system. On the other hand, the heavier particles adjacent the periphery of the separator gravitate downwardly and collect at the bottom of the separator as a liquid. The thus-collected liquid is conveniently returned to the spray nozzle, through a conduit operatively connected between the lower opening in the separator and the nozzle, by aspiration in the nozzle.

The aspiration created by the nozzle is produced by an air supply which is directed through the nozzle at a pressure between 3 and 20 psi. At those pressure levels, the spray nozzle produces, in the separator, a spray mist having particle sizes ranging from less than a micron to several microns in size. Typically, particles one micron or less in size remain within the central portion of the separator under the conditions described above and are used as a dry vapor in an air-conditioning system, for example, for treating the air supplied to a building.

The above, and other objects, features and advantages of this invention will be apparent in the following detailed description of an illustrative embodiment thereof which is to be read in connection with the accompanying drawings, wherein:

FIG. 1 is a schematic perspective view, with parts broken away, illustrating an air-treating device constructed in accordance with the present invention and positioned for use in an air-conditioning system;

FIG. 2 is an enlarged sectional elevational view of the apparatus illustrated in FIG. 1;

FIG. 3 is a sectional view taken along line 3—3 of FIG. 2; and

FIG. 4 is a sectional view, similar to FIG. 1 of another embodiment of the invention.

Referring to the drawing in detail, and initially to FIG. 1, it is seen that air-treating device 10, constructed in accordance with the present invention, includes a generally vertically extending vortex separator 12 having an upper discharge opening 14 in which a discharge conduit or vent 16 is connected. During operation of device 10, a spray mist is produced within vortex separator 12, with dry vapor particles of one micron or less being discharged therefrom, as described in greater detail hereinafter, through vent 16. The latter is adapted to be connected to air supply duct 18 of a central air-conditioning system (not shown) for use in a building requiring air-treatment apparatus. For example, the system of the present invention is extremely suitable for use in hospitals, old age and nursing homes, or the like.

When air-treating device 10 is used in a central air-conditioning system, as illustrated in FIG. 1, vent 16 is mounted to extend through opening 20 of the central air-conditioning duct 18. Preferably, the vent includes an upper guide portion or cap 22 which directs the dry air-treating vapor flowing through the vent 16 in the direction of the air flow within the air conduit. Thus, if the air in conduit 18 is flowing from left to right in FIG. 1, cap 22 is positioned to direct the vapor flowing in vent 16 towards the right so that it is absorbed by the air flowing in conduit 18 for distribution therewith.

Although vent 16 is shown in FIG. 1 as supplying vapor durectly to the air conduit 18, it also is contemplated that, in another embodiment of the invention, vapor can be supplied from vent 16 directly into the suction or in-feed side of the air blower used in the air distribution system. This can be done by directing a conduit from vent 16 directly into the blower along or adjacent the axis of rotation of the blower wheel. By this arrangement the improved mixing of the dry vapor with air is achieved by the agitation of the air and vapor in the blower. In addition, the diameter of vent 16, or any conduit connected thereto, may be varied as desired to restrict and control the amount of vapor discharged from separator 14. The diameter of vent 16 and any conduit connected thereto is a restriction to the flow of the dry vapor and thus limits the amount of vapor which can flow from the separator.

Vortex separator 12, as most clearly illustrated in FIG. 2, is of generally cylindrical construction, including upper cylindrical portion 24 and lower conical portion 25. Liquid air-treating agent aspirator nozzle 26 is mounted in extension 28 (see FIG. 3) of separator 12 adjacent the upper end thereof in order to direct a spray mist of liquid air-treating agent tangentially into the separator. Spray nozzle 26 is adapted to produce a spray mist having particle diameters in a range from less than one micron to at least several microns, with some particles of droplet size. As a result, and also because of the pressure under which nozzle 26 is operated, the spray mist travels in a spiral path, indicated by the arrows in FIG. 2, with the heavier particles therein, i.e., those above 1 micron in diameter, gravitating outwardly towards the periphery of the separator under the influence of centrifugal force, while the lighter particles, i.e., generally those of one micron or less in size, remain at the interior of the spiral adjacent the center of the vortex separator. The atmosphere in the separator is slightly above atmospheric, while the pressure in vent 16 is at atmospheric pressure (because it is connected to air duct 18). Hence, these lighter vapor particles — which resemble fog or smoke in appearance — are urged upwardly through the vent and, thus, into air supply duct 18. These particles are dry, i.e., they do not settle under gravity, and thus are highly satisfactory for use in air supply ducts. Also, the temperature of the particles is sufficiently near ambient temperature that they do not condense thermally.

The heavier particles formed in vortex separator 12 gravitate towards lower end 30 thereof wherein they pass through lower opening 32 into collection container 34. As these particles collect at the lower end of the vortex separator, they reform as liquid L which is collected in container 34. This liquid is returned to nozzle 26 through conduit 36, by the action of aspiration in nozzle 26.

As mentioned, nozzle 26 is an aspirator type nozzle of conventional construction. Air is supplied to nozzle 26 through air supply line 38 from compressor 40 or the like positioned in fluid communication with that line. Compressor 40 supplies air to nozzle 26, suitably at pressures between 3 and 20 psi, in order to aspirate liquid from supply line 36 and container 34 to produce the spray mist in vortex separator 12. Further, compressor 40 in turn may be controlled by any convenient type of timing mechanism 42, such as a conventional electronic timing mechanism, so that air is supplied to nozzle 26 only during predetermined periods, as required to maintain sanitary conditions in the atmosphere, or to supply sufficient air treating agent to the atmosphere to overcome odors.

As liquid air-treating agent is recycled through the vortex separator as described above, a certain portion of the air-treating agent is dissipated as dry vapor through vent 16. In addition, because of the fractionation of the air-treating agent passing through the spray nozzle, the composition of the air-treating agent may change somewhat during operation of the separator. Thus, it is desirable to introduce fresh air-treating agent in the system from time to time to maintain the desired composition and to replenish lost liquid.

To accomplish this purpose, reservoir supply 44 of air-treating agent L is connected through supply line 46 through conduit 36, as illustrated in FIG. 2. Reservoir 44 is located on substantially the same level as container 34 and holds a substantial supply of liquid L therein. By this construction, the supply of liquid in containers 34 and 44 and the liquid in conduits 36 and 46 cause the device to operate somewhat as a manometer so that the liquid levels in both container 34 and reservoir 44 remain at the same height. Of course, reservoir 44' has a sealable opening or cap 44' through which additional air-treating liquid can be supplied to the reservoir from time to time as required.

In this connection, as seen in FIGS. 1 and 2, an additional conduit 50 may be provided between the top of separator 14 and reservoir 44 to provide communication therebetween and thus maintain the pressures in the reservoir and separator at substantially the same level.

The vertically extending portion of conduit 36, which is connected to nozzle 26, is in fluid communication with both container 34 and reservoir 44 so that the liquids from both of the reservoirs will comingle. As a result, the composition of the liquid air-treating agent supplied to vortex separator 12 will remain substantially the same. In addition, by the use of reservoir 44 a continuous supply of liquid for the vortex separator is provided to replenish losses due to the discharge of vapor through vent 16.

In accordance with another aspect of the present invention, the operation of nozzle 26 and the supply of liquid air-treating agent L to the nozzle may be controlled so that during predetermined time periods only air will flow through nozzle 26. This is particularly desirable for flushing liquid from nozzle 26 when the device is shut off, thus preventing liquid air-treating agent remaining in the nozzle from drying and leaving undesirable solid deposits. Accordingly, it is contemplated that the flow of liquid air-treating agent to nozzle 26 be stopped at predetermined time periods while air from compressor 40 is continuously supplied to blow out any liquid remaining in the nozzle.

In one embodiment of the invention this is accomplished by the provision of valve mechanism 48 in conduit 36, adjacent nozzle 26. This valve means may take any convenient form, and may even by manually operated. However, in the preferred embodiment of the present invention the valve means is an electronically-operated valve, such as for exaample, a solenoid valve, which is controlled by timing mechanism 42. Thus, for example, timing mechanism 42 may be set to permit compressor 40 to operate for ½ hour, while simultaneously controlling solenoid valve 48 so that the valve remains in its open position only for 29 minutes. Thus, after valve 48 closes, air will still flow through nozzle 26 to blow any remaining liquid out of the nozzle. The specific circuitry for accomplishing this function is not illustrated herein in detail, since the specific manner of accomplishing this end forms no part of the present invention and is known to those skilled in the art.

Another, slightly modified embodiment of the present invention is illustrated in FIG. 4 of the drawing. As seen therein an air-treating device 60 is provided which is of substantially the same construction as the device 10 described above; accordingly, elements of air-treating device 60, which correspond to similar elements in air-treating device 10, have had corresponding reference numerals applied thereto. In this embodiment, a "T" connection 62 is provided between the liquid collection container 34 and the conduit 36 through which air-treating agent is returned to nozzle 26. The "T" connection is connected at one end 64, in any convenient manner, to the conduit 36 and also has a valve member 66 mounted or operatively connected therein, so as to selectively prevent flow of liquid from container 66 to conduit 36, for reasons more fully described hereinafter.

The opposite end 68 of "T" connection 66 is connected, also in any convenient manner, to a flexible hose or conduit 70. The latter is adapted to be inserted through the neck 72 of a container 74 which acts as a reservoir for the air-treating agent. By this construction of the invention the reservoir 44 is eliminated, and the container 74, which may be the container in which the air-treating agent is supplied by the manufacturer, is used in lieu thereof. Accordingly, the necessity of filling the reservoir from time to time, with its accompanying problems of spillage in the transfer of the liquid air-treating agent from a shipping container to the reservoir are avoided.

In order to place their air-treating device 60 in operation, with the container 74 acting as the reservoir for the air-treating agent, valve 66 is closed to prevent liquid flow from container 64 to the conduit 36. Thence, nozzle 26 is operated, through a compressor 40, thereby to draw or aspirate liquid from container 74 through conduits 70 and 36 to initiate operation of the air-treating device. This aspiration of liquid from container 74 draws the liquid through conduit 70 and serves to fill conduits 36 and 62 (up to the closed valve 64) with liquid, thus preventing air from entering the conduits and establishing a syphon between container 74 and conduit 62. Once the syphon is formed in conduit 70, the valve 66 is opened, so as to permit recycling of air-treating agent through the device 60 in the same manner as previously described with respect to the embodiment of the invention illustrated in FIG. 1 of the drawing. At this point, the container 74 acts in substantially the same manner as the reservoir 44 to maintain a constant supply of liquid air-treating agent to the device as is required because of evaporation and aspiration of liquid in the operation of the device. The syphon formed in conduit 70 thus serves to continuously supply air-treating agent to conduit 36. In addition, the liquid level L' developed in container 34 during operation of the device will be the same as the liquid level in container 74 at any given time since the liquid connection therebetween, through conduit 70 and the "T" connection acts as a manometer to keep the liquid levels in equilibrium.

Accordingly, it is seen that a relatively simple and inexpensive apparatus is provided in which a dry air vapor having relatively small vapor particles is produced and projected into the air supply duct of an air-conditioning system. As a result, an entire building can be treated with air-treating agent from a single source in a continuous and/or controlled manner, with no readily condensing liquid droplets being introduced into the air supply system.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. The method of treating air with dry vapor particles, with the aid of a vortex separator, which method comprises producing a spray mist of liquid air-treating agent having vapor particle sizes from less than one micron to at least several microns, introducing said spray mist tangentially into said vortex separator at the upper end of the separator, directing said spray mist in said separator along a spiral flow path to cause the larger of said particles to gravitate towards the periphery of said path and the vapor particles of one micron or less to remain adjacent the center of said path, removing said vapor particles from adjacent the center of said path, and introducing said vapor particles into the air to be treated; said step of producing a spray mist comprising the step of aspirating liquid air-treating agent in an air spray nozzle by passing air through said nozzle.

2. The method as defined in claim 1 wherein said step of passing air through said nozzle comprises passing air through the nozzle at a pressure of between 3 psi and 20 psi.

3. The method as defined in claim 1 wherein said removing step comprises the step of flowing said vapor particles of one micron or less from adjacent the center of said path in a generally vertical direction.

4. The method as defined in claim 3 including the steps of collecting unremoved vapor particles from said flow path as a liquid and utilizing said liquid in said step of producing a spray mist.

5. The method as defined in claim 4 including the steps of maintaining said flow path at a pressure slightly above atmospheric pressure.

6. The method as defined in claim 4 including the step of continuously supplying fresh liquid air-treating agent for said spraying step to replace agent lost in said removing step.

7. A device for producing a dry vapor from a liquid air-treating agent for use in air-conditioning systems or the like, which comprises a generally vertically extending vortex separator having upper and lower ends and including a centrally-located vapor discharge opening at its upper end and a liquid discharge opening at its lower end, and means for tangentially introducing liquid air-treating agent into said vortex separator adjacent the upper end thereof in a spray mist having particles in a size range from less than one micron to at least several microns, whereby said spray mist moves downwardly through said separator in a spiral, with the larger size particles therein being located adjacent the periphery of said separator and particles having a size of one micron or less being located adjacent the center of said separator and being discharged through said opening in said upper end portion; and means for collecting said larger size particles as a liquid and conduit means for providing fluid communication between said collecting means and said means for tangentially introducing liquid air-treating agent into said separator; said means for introducing liquid air-treating agent into said separator comprising a liquid aspirator spray nozzle and means for suppplying pressurized air to said nozzle whereby said nozzle aspirates liquid air-treating agent into said conduit means and projects said agent into the upper end of said separator as a spray mist.

8. A device for producing a dry vapor from a liquid air-treating agent for use in air-conditioning systems or the like, which comprises a generally vertically extending vortex separator having upper and lower ends and including a centrally-located vapor discharge opening at its upper end and a liquid discharge opening at its lower end, and means for tangentially introducing liquid air-treating agent into said vortex separator adjacent the upper end thereof in a spray mist having particles in a size range from less than one micron to at least several microns, whereby said spray mist downwardly through said separator in a spiral, with the larger size particles therein being located adjacent the periphery of said separator and particles having a size of one micron or less being located adjacent the center of said separator and being discharged through said opening in said upper end portion; said means for introducing liquid air-treating agent into said separator comprising a liquid aspirator spray nozzle and means for supplying pressurized air to said nozzle whereby said nozzle aspirates liquid air-treating agent and projects said agent into the upper end of said separator as a spray mist.

9. A device as defined in claim 8 wherein said vortex separator includes means for collecting said larger size particles as a liquid and conduit means for providing fluid communication between said collecting means and said means for tangentially introducing liquid air-treating agent into said separator.

10. A device as defined in claim 9 including means for selectively preventing fluid flow in said conduit means during operation of said air supply means whereby only air flows through said nozzle to remove air-treating agent or the like therein.

11. A device as defined in claim 4 including timing means for controlling the operation of said air supplying means.

12. A device as defined in claim 9 including a reservoir containing a supply of said liquid air-treating agent and being operatively connected in fluid communication with said conduit means, whereby air-treating agent used in said separator is replenished.

13. A device for producing a dry vapor from a liquid air-treating agent for use in air-conditioning systems or the like, which comprises a generally vertically extending unobstructed vortex separator having upper and lower end portions, said upper end portion having a centrally-located vapor discharge opening therein and said lower end portion having a liquid discharge opening therein, a liquid spray aspirator nozzle operatively associated with said vortex separator adjacent the upper end thereof and positioned to project a spray mist of liquid air-treating agent tangentially into the interior of said separator, conduit means operatively connected in fluid communication between said liquid discharge opening and said nozzle for supplying liquid from the lower end of said separator to said nozzle, and means for supplying pressurized air to said nozzle, whereby said nozzle aspirates liquid air-treating agent into said conduit means and tangentially projects into said separator a spray mist of said agent having a particle range from less than one micron to at least several microns, said spray mist thereby moving generally downwardly through said separator in a spiral path with the larger size particles thereof located adjacent the periphery of said separator and particles having a size of one micron or less being located adjacent the center of said separator at an area of reduced pressure and passing upwardly from the separator through said vapor opening, said larger particles being collected in the lower end of said separator and passing into said conduit for recycling through said nozzle.

14. The device as defined in claim 13 wherein said air supply means supplies air to said nozzle at a pressure of between 3 and 20 psi.

15. The device as defined in claim 14 including a reservoir containing a supply of said liquid air-treating agent and being operatively connected in fluid communication with said conduit means whereby air-treating agent discharged from said separator as vapor is replenished.

16. The device as defined in claim 15 including timing means for controlling the period of operation of said air supplying means.

17. The device as defined in claim 16 including a discharge vent operatively connected to said separator in fluid communication with said vapor opening for directing said discharged vapors in a predetermined direction.

18. The device as defined in claim 16 wherein said vortex separator has a generally cylindrical upper portion and a conically tapered lower portion.

19. The device as defined in claim 16 including means for selectively preventing liquid flow in said conduit means during operation of said air supply means, whereby only air flows through said nozzle to remove particles of liquid air-treating agent or the like therefrom.

20. The device as defined in claim 19 wherein said liquid flow-preventing means comprises valve means in said conduit means.

21. The device as defined in claim 20 wherein said valve means is responsive to said timing means and said timing means is adapted to control operation of both said valve and said air supply means.

* * * * *